Dec. 18, 1923.

R. G. DAY

GRADE METER

Filed April 8, 1922

Inventor
Robert G. Day
Eccleston & Eccleston
Attorneys

Patented Dec. 18, 1923.

1,477,545

UNITED STATES PATENT OFFICE.

ROBERT G. DAY, OF GREAT FALLS, MONTANA, ASSIGNOR OF ONE-HALF TO HAROLD M. MADY, OF GREAT FALLS, MONTANA.

GRADE METER.

Application filed April 8, 1922. Serial No. 550,659.

*To all whom it may concern:*

Be it known that I, ROBERT G. DAY, a citizen of the United States, residing at Great Falls, in the county of Cascade and State of Montana, have invented certain new and useful Improvements in Grade Meters, of which the following is a full, clear, and exact description.

My invention relates to grade meters, and has for its object to provide such a device which is operated by gravity and which may be carried by an automobile or other vehicle.

Another object of the invention is to balance the moving parts in such manner that the device is extremely sensitive to grade change and will indicate accurately on the dial any variations of the grade.

A further object of the invention is the construction of means for mounting the grade meter on the vehicle so that shocks and vibrations of the vehicle will be absorbed by the mounting means rather than transmitted to the grade meter.

Other objects and advantages of the invention will be apparent from the following description when taken in connection with the accompanying drawing, in which.

Figure 1:
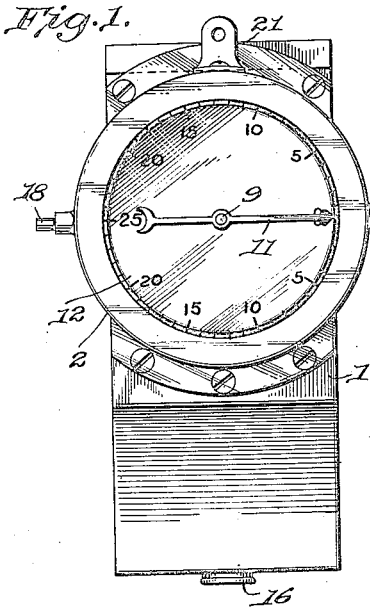
Figure 1 is a front elevation of the grade meter.
Figure 2:
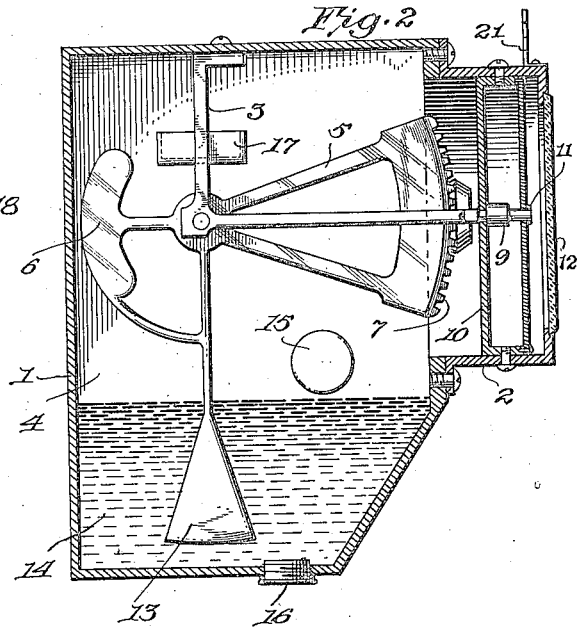
Figure 2 is a vertical section through the meter.
Figure 3:
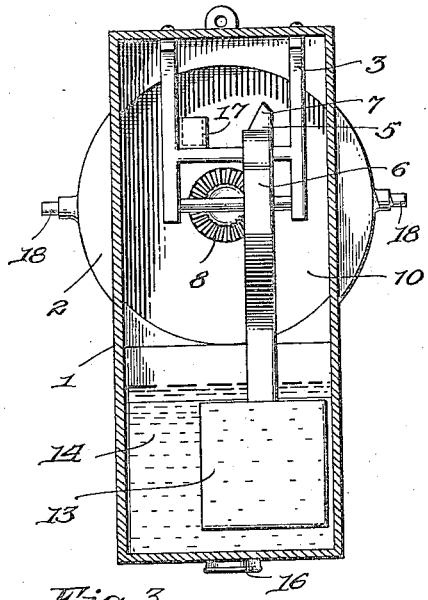
Figure 3 is a vertical section taken at right angles to that shown in Figure 2.
Figure 4:
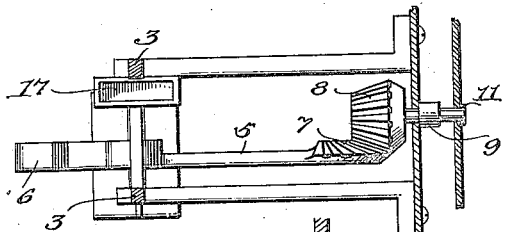
Figure 4 is a fragmentary horizontal section.
Figure 5:
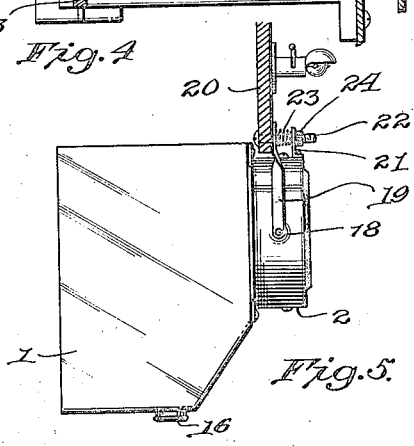
Figure 5 is a side elevation of a grade meter mounted on the instrument board of an automobile.

Referring to the drawing more in detail, the numeral 1 indicates the box or casing which is provided with an offset needle compartment 2 detachably connected therewith. A bracket 3 is fixed on the interior of the rear compartment 4 and has pivotally mounted thereon an arm 5 which is counterbalanced by means of the weight 6 rigidly connected to the rear end of said arm. The forward end of the arm 5 carries a segmental bevel gear 7 which meshes with a bevel gear 8. The bevel gear 8 is fixed on shaft 9 which has its bearing in a partition 10, the latter dividing the casing 1 into front and rear compartments.

The partition 10 is provided with suitable indicia forming a dial, and the shaft 9 carries at its forward end a needle 11, which in the operation of the device will move across the dial and indicate the grade percentage. A glass 12 is provided in the front of the casing for protecting the indicating means.

Rigidly connected with and depending from the arm 5 is a plumb bob or weight 13, which will, through the action of gravity, always move the arm 5 to a horizontal position, thereby operating the needle through the gears 7 and 8. In order to dampen the oscillations of the plumb bob 13, and likewise the needle 11, the lower portion of the casing 1 is partly filled with a liquid such as glycerine or the like, 14. Plugs 15 and 16 are provided for the purpose of respectively filling and emptying this compartment.

For the purpose of lubricating the moving parts of the mechanism an open-topped receptacle or tank 17 is mounted on the bracket 3. This receptacle 17 is filled with oil which will lubricate the various elements partly by vaporization and partly as a result of a portion of the oil being discharged from the receptacle over the mechanism when the machine is being driven over rough roads.

In a mechanism of this type it is essential to accuracy that the instrument be kept free from vibrations and the like, and to this end I have mounted the same on the instrument board by means of the laterally extending stub shafts 18—18 which have their bearings in the brackets 19 depending from the instrument board 20. A lug 21 extends upwardly from the forward end of the casing 1 and is apertured to receive a bolt 22 mounted on the instrument board. In mounting the grade meter a spring 23 is positioned on the bolt 22 between the instrument board 20 and the lug 21 and serves the purpose of absorbing shocks and vibrations of the automobile before they reach the instrument. A nut 24 is provided on the bolt 22 which is not only useful in adjusting the tension of the spring 23, but also may be used in adjusting the casing 1 to vertical position or so that the needle will point to the 0-mark when the automobile is on a level road.

From the foregoing description it will be seen that I have provided a very simple and yet sensitive grade meter which is entirely inclosed in a dust-proof casing. The meter is mounted in such a way that it may be readily adjusted or set so as to bring the needle to proper indicating position with respect to the indicia. Furthermore, by the use of the spring 23 in connection with the pivoted mounting the instrument is protected from shocks and vibrations of the automobile.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A grade meter including a casing, a vertically extending partition adjacent the forward end of said casing, a shaft journalled in said partition, a needle on the forward end of said shaft and a bevel gear on the opposite end thereof, an arm, a support on which said arm is pivoted, a lubricating receptacle mounted on said support, a segmental gear carried by said arm on one side of its pivot and operatively connected to said bevel gear, a counterbalancing weight carried by said arm on the other side of its pivot, and a weight depending from the pivot point of said counterbalanced arm.

2. A grade meter including a casing, a vertically extending partition adjacent the forward end of said casing, a shaft journalled in said partition, a needle on the forward end of said shaft and a bevel gear on the opposite end thereof, a pair of L-shaped brackets having their ends attached to the top of the casing and the partition, an arm pivoted between said brackets, a segmental gear carried by said arm on one side of its pivot and operatively connected to said bevel gear, a counterbalancing weight carried by said arm on the other side of its pivot, and a weight depending from the pivot point of said counterbalanced arm.

ROBERT G. DAY.